Nov. 13, 1934.　　S. B. BOWMAN ET AL　　1,980,373
METHOD AND APPARATUS FOR MANUFACTURING GLASSWARE
Filed May 5, 1931　　2 Sheets-Sheet 1
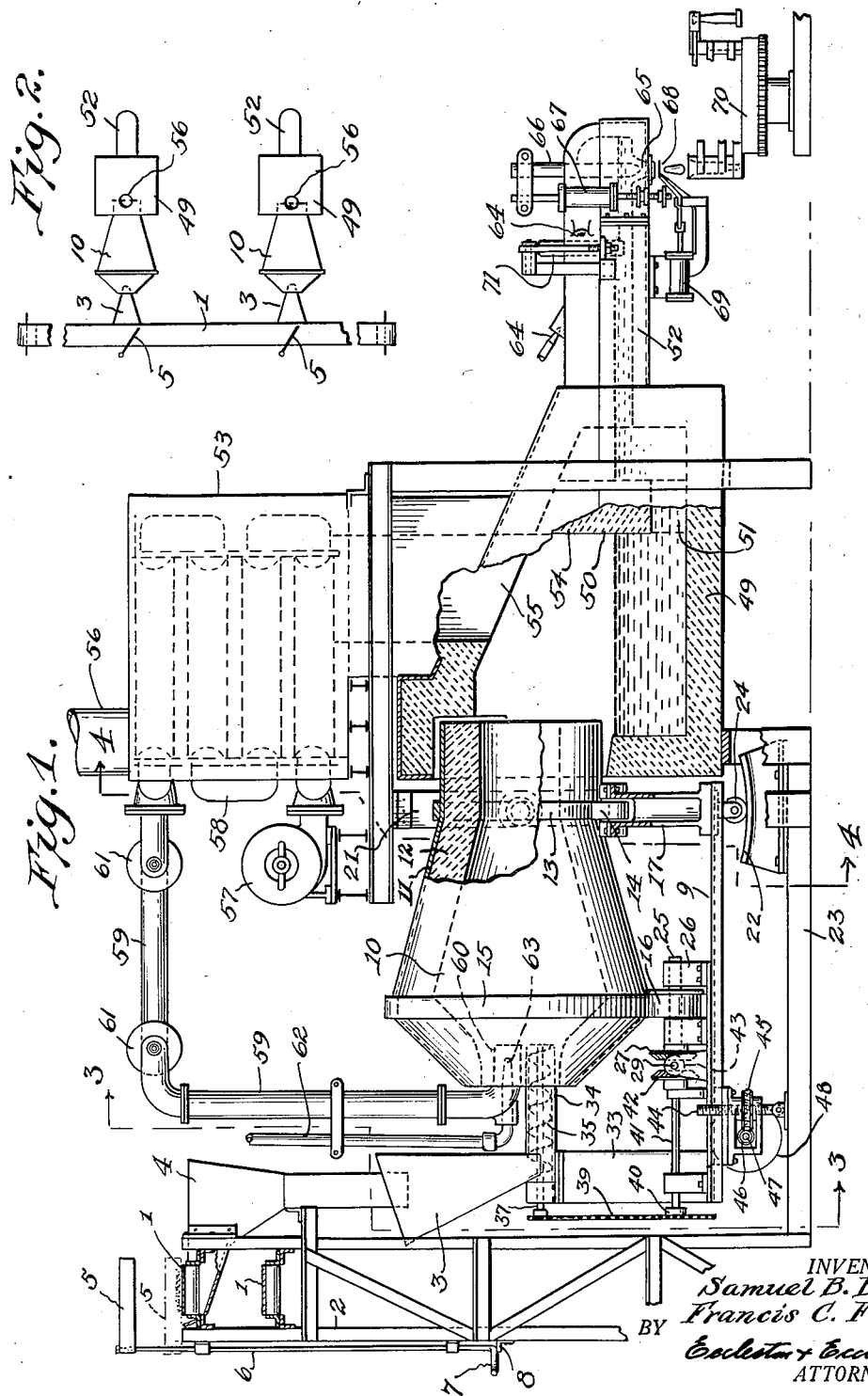
INVENTORS.
Samuel B. Bowman
Francis C. Flint
BY Eccleston & Eccleston
ATTORNEYS.

Patented Nov. 13, 1934

1,980,373

UNITED STATES PATENT OFFICE 1,980,373

METHOD AND APPARATUS FOR MANUFACTURING GLASSWARE

Samuel B. Bowman, Zanesville, Ohio, and Francis C. Flint, Washington, Pa., assignors to Hazel-Atlas Glass Company, Wheeling, W. Va., a corporation of West Virginia Application May 5, 1931, Serial No. 535,260

6 Claims. (Cl. 49—54)

The invention relates generally to a complete glass forming unit, or a series of units. Each unit includes means for carrying the batch to hoppers, associated with the tanks or furnaces, and means for introducing the batch into the furnaces. The furnace is a small individual one, of such size that it will melt enough glass for only one or two forming machines. The furnace per se constitutes one of the important features of the invention. Instead of the conventional glass tank, the present invention includes a tank which is given a very slow rotary motion, thereby very greatly increasing the melting capacity, for a given size tank, and possessing numerous other material advantages which will be apparent as the description proceeds. The rotary furnace involves a number of novel features, to be described hereinafter.

Forming part of each unit, is a small individual refining tank, which receives the melted glass from the rotary furnace. And a small recuperator is preferably associated with each refining tank, to preheat the air supplied with the fuel gas to the melting furnace. A flow spout leads from the refining tank, and this flow spout is provided with any desired feeding mechanism, such as the old reciprocating plug feeder, by which the charges are fed to a forming machine. While a single flow spout and a single forming machine will ordinarily be used in this glass forming unit, yet it will be understood that under some circumstances it will be desirable to employ a plurality of flow spouts and forming machines.

The use of a plurality of complete individual glass forming units presents a great advantage over the former practice. In accordance with the former practice, a large furnace capable of melting sufficient glass for a number of forming machines, is employed. To meet production requirements it may be necessary to operate only four of the forming machines out of eight machines, for example, associated with the furnace. Thus production is reduced by half, but it is apparent that the fuel consumption for this large furnace is not reduced to any such extent. In accordance with the present invention, the number of complete units in operation will be governed in exact accordance with production requirements; so that if it is possible to discontinue the operation of four forming machines out of eight, four furnaces will also go out of operation, and the fuel consumption and other expenses will be reduced by half. In other words, the furnace space will vary in exact accordance with the volume of production; which, of course, is not possible with the former practice.

Further, in accordance with the present invention it is possible to have a number of complete individual units each manufacturing a different color. While in accordance with the former practice, if one of the large furnaces is filled with green glass, for example, and it becomes necessary to manufacture some blue ware, the whole furnace and all the forming machines must be shut down, all the green glass must be removed, and the tank again started up with blue glass. The delay and the expense involved, are very great. The present invention permits one unit, or the desired number of units, to be employed for each color. And, of course, as production requirements change, any particular unit may be thrown into operation in a very few hours; or a unit could be changed from one color to another color, in a very few hours.

The many advantages resulting from the use of complete individual glass forming units, as distinguished from the former practice of employing a large furnace supplying glass to a great number of forming machines, will be apparent to those skilled in the art.

In addition to the advantages of the complete individual forming unit, the present invention also includes a novel glass melting furnace and method of melting glass, which of themselves involve many advantages over previously known furnaces and methods of melting glass. For example, the furnace is given a very slow rotary movement, whereby the melting capacity is greatly increased; or vice versa, for a given melting requirement the size of the furnace necessary is greatly reduced. Likewise, there is a very large saving in fuel consumption; and, by reason of the small size of the furnace rendered possible by the present invention, it is apparent that heating conditions can be rapidly changed, and permits the furnace to be easily adjusted about a horizontal axis, to suit varying conditions.

Other objects and advantages of the invention will be apparent from the following detailed description, when taken in connection with the accompanying drawings, in which Figure 1 is a side elevational view of the complete forming unit, parts being broken away to more clearly show the construction, and parts being illustrated more or less diagrammatically.

Figure 2 is a purely diagrammatic illustration of a plurality of units.

Figure 3:
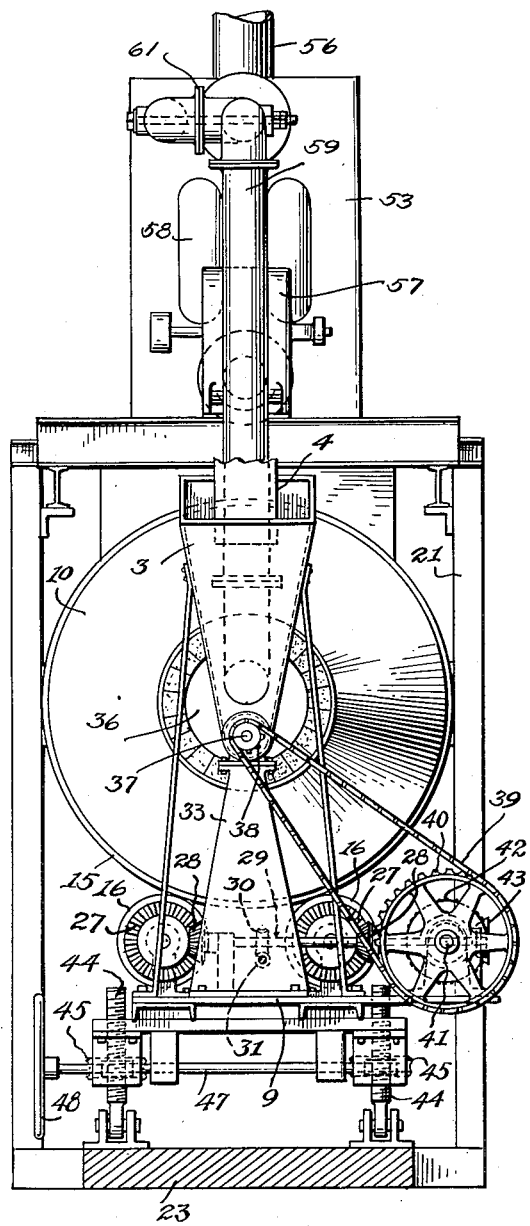
Figure 3 is a vertical sectional view of the apparatus, taken on line 3—3 of Figure 1.

Referring to the drawings in more detail, numeral 1 indicates an endless conveyer mounted on a frame 2, which conveyer carries the glass batch from any convenient source (not shown) to a series of the complete units. Associated with each furnace is a batch hopper 3, which is adjustable with the furnace as a unit, as will appear hereinafter. Arranged above each hopper 3, but separate therefrom, is a chute 4 adapted to receive the batch from the conveyer 1, whenever the hopper 3 needs charging. It will be apparent that in some installations the chute may be omitted.

For the purpose of charging the hoppers from time to time, a wiper bar 5 is mounted on the conveyer frame, adjacent each hopper. The bar 5 is carried by a rod 6 suitably mounted on the conveyer frame, for vertical movement. The rod is provided with an operating handle 7 which, when the wiper bar is in its upper inoperative position, rests on a latch 8. When any particular hopper needs charging, the handle of that particular wiper is rotated to free it from the latch, and the wiper bar drops onto the conveyer 1, whereby the batch will be directed into the particular hopper where it is needed. Obviously, other mechanical devices may be employed to charge the various hoppers as required.

Numeral 9 refers generally to an adjustable frame, which frame carries the rotary furnace, the hopper, the mechanism for feeding the batch from the hopper to the furnace, the mechanism for driving the batch feeder, and the mechanism for rotating the furnace; so that all of these elements are adjustable as a unit.

The revolving tank or furnace is referred to by numeral 10, and consists of a metallic casing 11 and an inner lining of refractory material 12. Of course, the invention is not limited to any particular shape of the rotary furnace, but the preferred form is as illustrated. It will be noted that the shape is such that the greatest interior diameter of the tank, and hence the greatest depth of glass, is at a point adjacent the rear end, and that from such point the walls gradually converge toward both the front and the rear. The extreme forward end portion of the furnace is illustrated as cylindrical, but obviously the wall could converge from the point of greatest diameter directly to the front end of the furnace, thus eliminating this cylindrical portion. By reason of its particular shape the furnace is given a greater capacity and a greater melting area.

The furnace is preferably given a very slow rotary movement, often as slow as one complete revolution every twenty minutes. By this very slow rotation of the furnace, the glass is not violently disturbed, which would be fatal to the manufacture of good glass; but on the contrary, the glass is given a placid and undisturbed yet continuous movement, whereby different portions of glass are being continuously exposed directly to the heat of the furnace. It is thus apparent that the melting of the batch is accomplished in far less time than has been possible in the conventional glass furnaces; or, in other words, the melting capacity is greatly increased. The melting capacity is so great that the tank need be only a very few feet in diameter and length to supply the necessary glass for one forming machine, and the cost of construction, the up-keep, and the fuel consumption of this furnace, are almost negligible as compared with the conventional tanks heretofore used.

Figure 4:
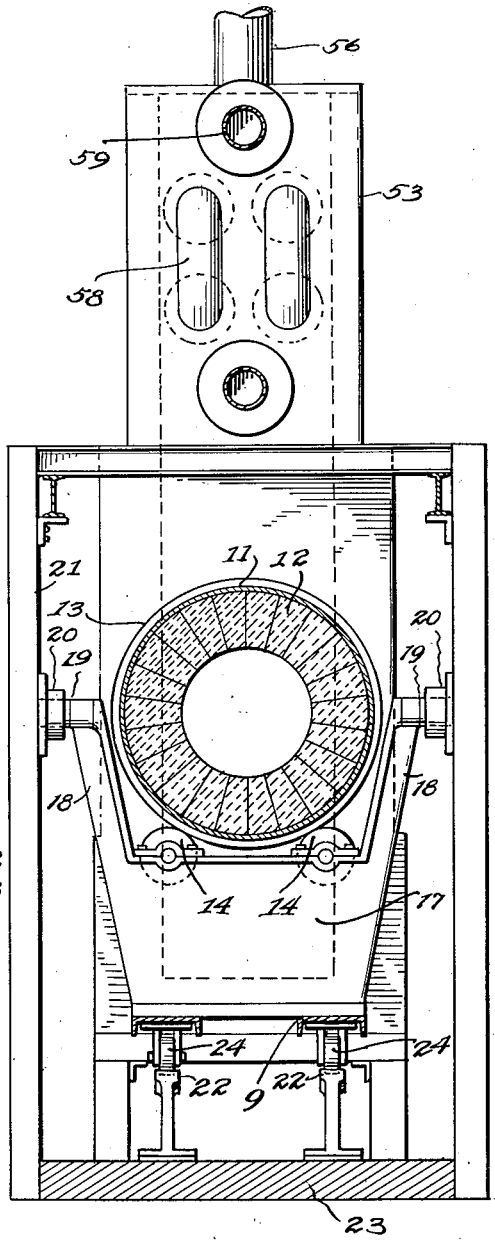
Figure 4 is a similar view taken on line 4—4 of Figure 1.

The forward portion of the melting furnace is provided with a bearing band 13, resting upon roller 14, and the rear portion of the furnace is provided with a similar band 15, resting on rollers 16. The rollers 14 are mounted in suitable bearings in a bracket 17 carried by the frame 9. The construction of this bracket is best shown in Figure 4, and it will be noted that the bracket is provided with upwardly extending arms 18 having trunnions 19 mounted in bearings 20 carried by the fixed standards 21. This construction permits the furnace to be tilted to the desired angle.

In order to relieve the trunnions of the weight of the furnace, arcuate shaped rails 22 are mounted on the base member 23; and rollers 24 provided on the forward portion of the frame 9, ride on these rails. The rails are designed on an arc about the axis of the trunnions 19 as a center; so that as the front end of the furnace is tilted up or down the rails continue to act as the support.

The rollers 16 are keyed to shafts 25 mounted in bearings 26 on the frame 9. For rotating the rollers 16, and thereby rotating the furnace 10, each of the shafts 25 has keyed thereto a bevel gear 27. These gears mesh with gears 28 keyed to a shaft 29. The shaft is rotated by any preferred mechanism, such as by worm wheel 30 keyed to the shaft and meshing with a worm 31 driven by a motor (not shown).

The batch feeder, for feeding the batch into the rotary furnace, is mounted on a bracket 33 carried by the frame 9. The preferred form of feeder comprises a casing 34 which communicates with the lower end of the hopper 3, and a screw 35 adapted to continuously rotate in the casing and continuously force the batch forward where it is delivered to the furnace; the feeder projecting a short distance into the furnace through its open rear end 36. In the specific form illustrated here the feed screw 35 is continuously rotated by the same mechanism which continuously rotates the furnace, though at different speeds, of course. The shaft 37 of the feed screw is provided with a sprocket wheel 38, driven by a sprocket chain 39 which passes over the larger sprocket wheel 40. This sprocket wheel is fixed to shaft 41 provided with a bevel gear 42 driven by gear 43 fixed to shaft 29.

It will be understood, of course, that any desired means may be provided for changing the speed of the feed screw independently of the speed of the rotary furnace; or, if preferred, the feed screw may be driven entirely independent of the furnace.

From the foregoing description it will be noted that the furnace, the mechanism for slowly rotating the furnace, the batch feeder, and the mechanism for operating the batch feeder, are all mounted on a single frame, as a unit. This permits the furnace to be adjusted as desired, without in any way affecting or interrupting the continuous feed of the batch thereto. In the drawings the furnace is shown as horizontal, but in practice, it is nearly always given a slight tilt downwardly; the extent of the tilt depending upon various operating conditions. The mechanism for raising or lowering the rear end of the furnace, to tilt the mouth down to a varying degree, consists of screw jacks 44 pivotally mounted on the base 23. A worm gear 45 is threaded on each screw 44, and worms 46, on shaft 47, mesh with these worm gears. A hand wheel 48 is fixed to the shaft 47, and it is apparent that by the rotation of this hand wheel in the desired direction, the frame, the rotary furnace, the batch feeder, and the associated parts, may be tilted as a unit about the trunnions 19 as a pivot; the rollers 24 riding upon the arcuate rails 22, and relieving the trunnions of the stress.

The melted glass flows from the slowly revolving furnace into a refining tank 49, provided mith a bridgewall 50, having one or more throats 51, through which the refined glass flows to a flow spout 52. Mounted above the refining tank 49 is a small recuperator 53. The heated gases from the refining tank are diverted upward by the upward extension 54 of the bridgewall 50; and passing through an appropriate passage 55 enter the bottom of the recuperator 53. The heated gas passes upwardly through the recuperator and exhausts through a stack 56. Associated with the recuperator is a motor driven blower 57 which forces air through a coil of pipes 58 arranged in the recuperator; and the spent gases give up their heat to the air in the pipes, in the well known manner. The heated air is conducted through pipe 59 to a nozzle 60 projecting into the furnace through the opening 36; the pipe being provided with swing joints 61 permitting the proper flexing of the pipe to suit varying adjustments of the revolving furnace 10. The fuel gas is supplied to the furnace through a pipe 62 having a nozzle 63 which projects into the nozzle 60 of the air pipe 59. Of course, appropriate valves (not shown) are provided for independently controlling the volume of fuel gas and the volume of air; and the nozzles may be flexed to project the fuel gas and air into the furnace at the desired angle. As before described, the combustion gases after passing through the rotary furnace enter the refining tank, and finally the spent gases pass through the recuperator 53 to preheat the combustion air.

In the particular construction illustrated the flow of the products of combustion from the refining tank to the flow spout is entirely shut off by the wall 54; and to independently control the temperature of the glass in the flow spout, a plurality of burners 64 is provided. The flow spout, adjacent its forward end, is provided with a flow orifice 65. The feeding of glass through this orifice may be controlled by any of the old and well known reciprocating plunger or pneumatic feeders. The drawings illustrate, more or less diagrammatically, a plunger 66 reciprocated by a cylinder 67, and shears 68 arranged below the orifice and operated by a cylinder 69, to sever the glass charges which drop into the molds of any desired type of forming machine 70. A gate 71 is provided in the flow spout for the purpose of entirely shutting off the flow of glass to the feeder.

The construction and operation of the complete glass forming units, and the construction and operation of the revolving furnace per se, will be understood from the foregoing description; and the many advantages thereof will be apparent. It will also be apparent that both the apparatus and the method may be subject to many changes and modifications, without departing from the spirit of the invention; and all such changes and modifications are intended to be included within the scope of the appended claims.

What we claim is:

1. Apparatus for melting glass, including a rotary furnace, rollers upon which the furnace is mounted, a frame carrying said rollers, said frame being pivotally mounted, arcuate rails supporting the forward end of the frame, the arc of said rails being about the said pivotal mounting as a center, and means for vertically adjusting the rear end of the frame.

2. Apparatus for melting glass, including a rotary furnace, a frame carrying said furnace, trunnions provided on said frame and mounted in bearings in fixed standards, rails below said frame, rollers carried by said frame and adapted to ride on the rails, said rails being on an arc about the axis of the trunnions as a center, and means for adjustably raising and lowering the end of the frame remote from said trunnions.

3. Apparatus for melting glass, including a rotary furnace, a frame carrying said furnace, trunnions provided on said frame adjacent its forward end and mounted in bearings in fixed standards, rails below said said frame, rollers carried by said frame and adapted to ride on the rails, said rails being on an arc about the axis of the trunnions as a center, and means adjacent the rear end of the frame for adjustably tilting the frame about said trunnions.

4. Apparatus for melting glass, including a rotary furnace, rollers upon which said furnace is mounted, a frame carrying said rollers, trunnions provided on said frame and mounted in bearings in fixed standards, rails below the frame and supporting the forward end thereof, said rails being on arcs about the axis of said trunnions as a center, means mounted on the frame for rotating the furnace, a batch feeder mounted on the frame, means mounted on the frame for operating the batch feeder, and means for adjustably raising and lowering the rear end of the frame.

5. The method of melting glass which comprises continuously feeding batch to a furnace, maintaining the furnace at a temperature sufficient to melt the batch, continuously rotating the furnace at an extremely low speed to facilitate the melting process without violently disturbing the glass, and continuously discharging the molten glass.

6. The method of melting glass which comprises continuously feeding batch to a furnace, maintaining the furnace at a temperature sufficient to melt the batch, continuously rotating the furnace at a speed as low as approximately three complete revolutions per hour to facilitate the melting process without violently disturbing the glass, and continuously discharging the molten glass.

SAMUEL B. BOWMAN.
FRANCIS C. FLINT.